United States Patent [19]

Harbin et al.

[11] Patent Number: 5,488,737

[45] Date of Patent: Jan. 30, 1996

[54] LAND-BASED WIRELESS COMMUNICATIONS SYSTEM HAVING A SCANNED DIRECTIONAL ANTENNA

[75] Inventors: Steven A. Harbin, Grover; Brian K. Rainer, Chesterfield, both of Mo.

[73] Assignee: Southwestern Bell Technology Resources, Inc., St. Louis, Mo.

[21] Appl. No.: 977,635

[22] Filed: Nov. 17, 1992

[51] Int. Cl.$^6$ .............................. H04Q 7/20; H04B 7/00
[52] U.S. Cl. ..................... 455/33.1; 455/54.1; 455/56.1; 455/277.2; 379/59
[58] Field of Search .................................. 455/33.1, 33.3, 455/56.1, 62, 63, 277.1, 278.1, 54.1, 54.2, 67.1, 67.3, 133, 161.1, 161.2, 161.3, 276.1, 277.1, 277.2, 278.1; 379/58, 59, 60, 63; 342/367, 374, 360; 340/825.44; 343/703

[56] References Cited

U.S. PATENT DOCUMENTS

| | | | |
|---|---|---|---|
| 2,685,642 | 8/1954 | Vallarino et al. | |
| 3,340,531 | 9/1967 | Kefalas et al. | |
| 3,663,762 | 5/1972 | Joel, Jr. | |
| 4,101,836 | 7/1978 | Craig et al. | |
| 4,128,740 | 12/1978 | Graziano | |
| 4,249,181 | 2/1981 | Lee | 455/33.3 |
| 4,317,229 | 2/1982 | Craig et al. | 455/277.1 |
| 4,517,669 | 5/1985 | Freeburg et al. | 455/33.3 |
| 4,654,879 | 3/1987 | Goldman et al. | |
| 4,726,050 | 2/1988 | Menich et al. | 455/33.3 |
| 4,845,504 | 7/1989 | Roberts et al. | 455/54.1 |
| 5,067,147 | 11/1991 | Lee | |
| 5,117,236 | 5/1992 | Chang et al. | |
| 5,151,704 | 9/1992 | Gunmer et al. | 455/33.3 |
| 5,175,878 | 12/1992 | Davis et al. | 455/277.1 |
| 5,303,240 | 4/1994 | Borras et al. | 370/95.3 |

FOREIGN PATENT DOCUMENTS

| | | |
|---|---|---|
| 0077731 | 4/1983 | European Pat. Off. |
| 0540387 | 5/1993 | European Pat. Off. |
| 8908369 | 9/1989 | WIPO |

OTHER PUBLICATIONS

J. Zander et al., "On the capacity of Time–Space Switched Cellular Radio Linked Systems for Metropolitan Area Networks", Winlab (1992), pp. 77–81.

S. C. Swales et al., "Multi–Beam Adaptive Base–Station Antennas for Cellular Land Mobile Radio Systems", CH2379–1/89/0000/0341, IEEE (1989), pp. 341–348.

Dr. R. Roy, "Spatial Division Multiple Access Wireless Information Networks", Winlab (1992), pp. 83–95.

Ichikawa et al., "Dynamic Channel Assignment Using Sub–carrier Muliplexing Techniques in Microcellular Systems", 0–7803–0673–2/92 IEEE (1992), pp. 645–648.

O'Byrne, "TDMA and CDMA in a Fiber–Optic Environment", GTE Laboratories, Inc., 0–7803–0673–2.92 IEEE (1992), pp. 727–731.

W. C. Jakes, Jr., ed., "Microwave Mobile Communications", New York: Wiley & Sons, 1974, pp. 140–147.

(List continued on next page.)

Primary Examiner—Edward F. Urban
Assistant Examiner—Lisa Charouel
Attorney, Agent, or Firm—Sandler, Greenblum & Bernstein

[57] ABSTRACT

A radio communication system is disclosed which comprises a base station for transmitting and receiving signals to and from one or more remote stations. The base station is provided with at least one receive antenna coupled to a base station receiver. The receive antenna is provided with a directional pattern in a horizontal plane and a mechanism for steering the directional pattern azimuthly, until such time as a synchronization signal transmitted by a remote station located within the coverage area is received by the base station receiver. Upon detection of the synchronization signal, scanning of the receive antenna's pattern is stopped until such time as message information can be obtained from the remote station and forwarded to a particular destination requested by the remote station. Upon receiving the information, the base station will resume scanning of the antenna, and the information will be forwarded to its requested destination.

40 Claims, 8 Drawing Sheets

OTHER PUBLICATIONS

J. Jeter, "Rechargable Battery Advances Spark Innovations", *Telephony*, Mar. 18, 1991, pp. 130–134.

G. J. Burke, A. J. Poggio, *Numerical Electromagnetics Code (NEC)–Method of Moments*, Jan. 1981.

Y. Okumura et al., "Field Strength and its Variability in the VHF and UHF Land–Mobile Radio Service", *Rev. Tokyo Electron. Commun. Lab.*, Sep.–Oct., 1968, pp. 825–873.

C. A. Balanis, "Antenna Theory, Analysis and Design", Harper and Row, New York, 1982, pp. 204–274.

Johnson & Jasik, "Antenna Engineering Handbook", McGraw Hill, New York, 1984, pp. 20–1 to 20–67.

J. R. James et al., "Microstrip Antenna Theory and Design", Peter Peregrinus, Ltd., London, 1986, pp. 10 and 111–175.

Modification of Final Judgement (revised 1992) in *U.S.A. v. Western Electric Company et al.*, Action No. 82–0192.

Dec. 3, 1987 opinion in *U.S.A. v. Western Electric et al.*, Civil Action No. 82–0192.

International Search Report and Annex.

"Antenna Theory and Design", Stutzman et al. copyright 1981, pp. 134–137.

LAND-BASED WIRELESS COMMUNICATIONS SYSTEM HAVING A SCANNED DIRECTIONAL ANTENNA

FIELD OF THE INVENTION

The present invention is directed to a wireless communication system having a base station which transmits and receives signals to and from one or more remote stations. More specifically, the present invention is directed to a wireless communication system having an enhanced base station receive capability.

DISCUSSION OF BACKGROUND INFORMATION

Conventional two-way wireless communication systems typically comprise a network of base stations which transmit and receive signals to and from remote stations, which are, e.g., mobile or portable. The base stations are provided with fixed gain, fixed pattern antennas which are coupled to radio transceivers. Each base station serves a particular coverage area, and facilitates communication of information with remote stations which are located within the coverage area. Since the remote stations are typically limited in size, and because they are wireless, thus having a limited range within which they can transmit and receive signals, the base stations are provided to "bridge" the communication gap between each remote station and other stations which are outside the transmit and receive range of the remote station. While the remote station has a limited transmit and receive range, the base station has a virtually unlimited capability to relay information to almost any location via, e.g., a permanently wired network such as, e.g., a public switched telephone network.

The transmitter power levels and antenna gains of the base and remote stations are selected so that information transmitted from each remote station will be received by the associated base station, and so that information transmitted by the base station will be received by each remote station located within the coverage area of the base station.

In order to accommodate a large subscriber area within which remote stations can freely communicate, all portions of the total subscriber area must be within range of a base station. Accordingly, a sufficient number of base stations are arranged so that their respective coverage areas (sometimes referred to as "cells") together will cover all portions of the subscriber area. In order to minimize the number of base stations needed to accommodate a given subscriber area, the base station transmitter power level (and associated antenna gain) should be maximized (subject to practical and regulatory limitations) so that any remote station located within the coverage area of that base station can accurately receive signals transmitted from the base station. In addition, the receive gain of each base station antenna should be maximized in order to increase the probability that signals transmitted by remote stations located within the coverage area will be received by the base station.

Wireless personal communication systems, such as cellular telephone systems, answer back paging systems, wireless data networks, specialized mobile radio networks (SMR), and rural radio telephone systems (RRTS), utilize portable remote station terminals which depend primarily on battery technology as the primary source of electrical power. Although high energy density batteries and low power electronics have brought about a reduction in the size and weight of conventional portable communications terminals, batteries still comprise the bulk of the volume and weight of typical portable terminals. Modern cellular, paging and home cordless portable remote terminals have been found to attribute over 17% of their volume to just the battery supply. Accordingly, battery life and remote station terminal size are significant factors which dictate the system architectures of emerging communications systems such as personal communications networks (PCNs) and wireless local loop access systems.

For these reasons, in order to minimize the weight and size of the portable terminals (so that the terminals can be "portable"), paging systems are usually provided with only a one-way (base station to remote station) communications capability. In addition, cellular telephone systems typically deploy a large number of relatively low power base stations throughout the portable service area, so that small size portables which have limited transmit power can communicate with the network via a nearby low power base station. Such a cellular network configuration is referred to as a "microcellular network."

As noted above, the paging system, in order to reduce the size of portable terminals, will be provided with only a one-way communications capability, while the microcellular system is provided with an increased number of base stations. As a result, the paging system has reduced capabilities, and the microcellular telephone system is more expensive.

In order to increase the potential receive range of base stations, some conventional land-based mobile radio systems are provided with fixed directional antennas having a large beam width in the horizontal azimuthal plane. Typical commercially available antennas include, e.g., stationary directional antennas having a fixed 60° half-power beam width in the azimuthal plane and +16 dB of gain. Much of the gain is achieved by arranging multiple antennas horizontally and focusing the beam by narrowing the beam width in the elevation plane. Elevation beam widths narrower than about 6° are normally avoided to prevent overshooting of the desired coverage area due to antenna mounting inaccuracies and tower sway.

Definitions

For purposes of clarification, and to assist readers in understanding the present invention, the following terms are defined:

DIRECTIONAL ANTENNA PATTERN—A graphical representation of the radiation or reception of an antenna as a function of the direction at which the antenna is facing.

AZIMUTH—The direction of a distant point from an origination point (point of reference), expressed as the angle in the horizontal plane between a reference line and the horizontal projection of a line joining the two points.

SUMMARY OF THE INVENTION

In view of the above, the present invention, through one or more of its various aspects and/or embodiments, is thus presented to bring about one or more objects and advantages, such as those noted below.

Accordingly, it is an object of the present invention to provide a land-based wireless mobile communication system which includes base stations that can detect low level signals. By providing the base stations with the capability to detect weak signals, the coverage area of the base station can be maximized, and/or the transmission power of the remote station terminals can be minimized.

Another object of the present invention, in accordance with a particular aspect thereof, is to reduce the strength of signals transmitted from remote stations to the base station, which would thus allow the battery life of the remote terminal to be extended and/or the battery weight and size requirements to be significantly reduced.

A yet further object of the present invention is to provide a wireless mobile communications system having one or more base stations each having a receive antenna with a steerable, narrow beam width, high gain antenna pattern. Accordingly, there will be less interference between base stations due to the use of directional narrow beam antennas. In addition, a more efficient use of the frequency spectrum can be effected by synchronizing the scanning of the antennas of adjacent base stations (which use the same frequency carriers).

It is yet a further object of the present invention to reduce multi-path effects and fading, and thus to minimize performance degradation due to such effects, by enhancing the receive capability of the base stations of the land-based wireless mobile communications system.

The present invention, therefore, is directed to a radio communications system and a method for communicating, in which a receiving antenna of a base station, which has a directional pattern in a horizontal plane, is scanned azimuthly. In accordance with the radio communications system, a base station is provided for transmitting and receiving signals to and from one or more remote stations. The base station includes at least one receive antenna coupled to a base station receiver. A device is provided for filtering a signal received at the least one receive antenna, and a further device is provided for processing the received signal after filtering by the filtering device. A control mechanism is provided for controlling the scanning of the directional pattern of the received antenna.

In accordance with a particular aspect of the radio communications system of the present invention, an additional device is provided for monitoring the signal strength of the received signal, and the scanning control mechanism is provided with a device for controlling scanning of the directional pattern as a function of the signal strength of the received signal. In this regard, the controlling mechanism may be provided with a device for instructing the scanning device to stop scanning the directional pattern when the signal strength of the received signal is above a predetermined threshold value.

In accordance with a further aspect of the present invention, the system includes the one or more remote stations. Selected ones of the remote stations each comprise a device for transmitting an identifying signal pattern and message information within a frequency band monitored by the base station receiver. The transmitting device may be provided with a device for phrasing the message information to include an origination address, a destination address, a message, and error correction information, so that all of the message information is transmitted subsequent to transmission of the identifying signal pattern. In addition, the processing device may include a device for decoding information which is included in the received signal and a device for monitoring a signal strength of the received signal. In this regard, the control device may include a device for determining if a received signal level, which is determined by the monitoring device, is greater than a predetermined threshold value, and the control device may also include a device for controlling the scanning device to move the directional pattern to a next azimuthal position if the receive signal level is not greater than the predetermined threshold value.

The threshold value may comprise a signal level which is substantially higher than an expected background noise level. The decoding device can include a device for decoding the identifying signal pattern, and the system may be further provided with a device for determining if the identifying signal pattern has been correctly decoded. In addition, the system may be provided with a device for decoding remaining portions of the received signal and forwarding a corresponding message to a network, if it is determined by the determining device that the identifying signal pattern has been correctly decoded. In this regard, the scanning control device will be provided with a further device for controlling the scanning device to move the directional pattern to a next azimuthal position if the identifying signal pattern has not been correctly decoded.

In accordance with a further aspect of the radio communications system of the present invention, the antenna includes an array of collinear dipole antennas.

The radio communications system may comprise a microcellular communications network, a wireless data network, or an answer-back paging system.

In addition, the radio communications system of the present invention may be provided with a network control center connected to the base station and a telecommunications switching network. Each of the remote stations may comprise a transmitter which transmits signals having an effective isotropic radiated power of less than 4 watts. More particularly, each of the remote stations may include a transmitter which transmits signals having an effective isotropic radiated power of less than 2 watts. In addition, the directional pattern of the base station can include a half power beam width in the azimuthal plane of less than 30 degrees and in the elevation plane of less than 30 degrees. More particularly, the directional pattern may comprise a half power beam width in the azimuthal plane of less than 6 degrees and in the elevation plane of less than 8 degrees.

In accordance with a further aspect of the radio communications system of the present invention, the at least one receive antenna of the base station comprises a plurality of distinct antennas, and each of the distinct antennas comprise a directional beam which can be scanned azimuthly across a range equal to a fraction of 360 degrees. The distinct antennas are arranged so that the total area scanned by the distinct antennas equals 360 degrees.

In accordance with yet a further aspect of the present invention, the radio communications system further comprises a plurality of base stations. A portion of the plurality of base stations include receivers and corresponding scanned base station receive antennas which share a common frequency channel. The system further comprises a device for synchronizing the scanning of the base station receive antennas which share a common frequency channel.

Each of the remote stations may include an omnidirectional antenna coupled to a transmitter and a receiver, for transmitting and receiving signals to and from the base station. The base station may also be provided an omnidirectional transmit antenna.

In accordance with an alternative aspect of the radio communications system of the present invention, a base station is provided for receiving signals from one or more remote stations. The base station includes at least one receive antenna coupled to a base station receiver. The receive antenna has a directional pattern in a horizontal plane and a device for scanning the directional pattern azimuthly. A base station may also be provided with a capability of transmitting signals to one or more remote stations.

In accordance with the method for communicating of the present invention, a base station is operated to transmit and receive signals to and from one or more remote stations. The operating includes azimuthly scanning at least one receive antenna coupled to a receiver of the base station, wherein the receive antenna has a directional pattern in a horizontal plane. A signal received at the at least one receive antenna is filtered, the received signal is processed after filtering, and the scanning is controlled. The method may further include monitoring the signal strength of the received signal, and controlling scanning of the directional pattern as a function of the signal strength of the received signal.

In accordance with a further aspect of the present invention, the controlling includes instructing a scanning device to stop scanning the directional pattern when the signal strength of the received signal is above a predetermined threshold value. Selected ones of the remote stations may be operated to transmit an identifying signal pattern and message information within a frequency band monitored by the base station receiver. In this regard, the method may further comprise operating the selected ones of the remote stations to phrase the message information to include an origination address, a destination address, a message, and error correction information, so that all of the message information is transmitted subsequent to transmission of the identifying signal pattern. The processing may comprise decoding information which is included in the received signal and monitoring a signal strength of the received signal. Moreover, the method may include steps such as determining if a received signal level, which is determined during the monitoring, is greater than a predetermined threshold value, and controlling the scanning to move the directional pattern to a next azimuthal position if the received signal level is not greater than the predetermined threshold value. The predetermined threshold value may include a signal level which is substantially higher than an expected background noise level.

The decoding may include decoding the identifying signal pattern, and the method may be further provided with steps such as determining if the identifying signal pattern has been correctly decoded, decoding remaining portions of the received signal and forwarding a corresponding message to a network, if it is determined that the identifying signal pattern has been correctly decoded. In addition, the method may include controlling the scanning to move the directional pattern to a next azimuthal position if the identifying signal pattern has not been correctly decoded.

The antenna may comprise an array of collinear dipole antennas.

The method of the present invention may utilize a microcellular communications network, a wireless data network, or an answer back paging system.

A network control center may be operated which is connected to the base station and a telecommunications switching network. Each of the remote stations may comprise a transmitter which transmits signals having an effective isotropic radiated power of less than 4 watts, and more particularly having an effective isotropic radiated power of less than 2 watts. In addition, the directional pattern may include a half power beam width in the azimuthal plane of less than 30 degrees and in the elevation plane of less than 30 degrees, and more particularly, a half power beam width in the azimuthal plane of less than 6 degrees and in the elevation plane of less than 8 degrees.

The at least one receive antenna may include a plurality of distinct antennas, and the communicating method may further comprise scanning a directional beam of each of the distinct antennas azimuthly across a range equal to a fraction of 360 degrees, the individual antennas being arranged so that the total area scanned by the distinct antennas equals 360 degrees.

The method may further include operating a plurality of base stations, a portion of the plurality of base stations comprising receivers and corresponding scanned base station receive antennas which share a common frequency channel, and synchronizing the scanning of the base station receive antennas which share a common frequency channel. Each of the remote stations may include an omnidirectional antenna coupled to a transmitter and a receiver, for transmitting and receiving signals to and from the base station, and the base station may comprise an omnidirectional transmit antenna.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1A:
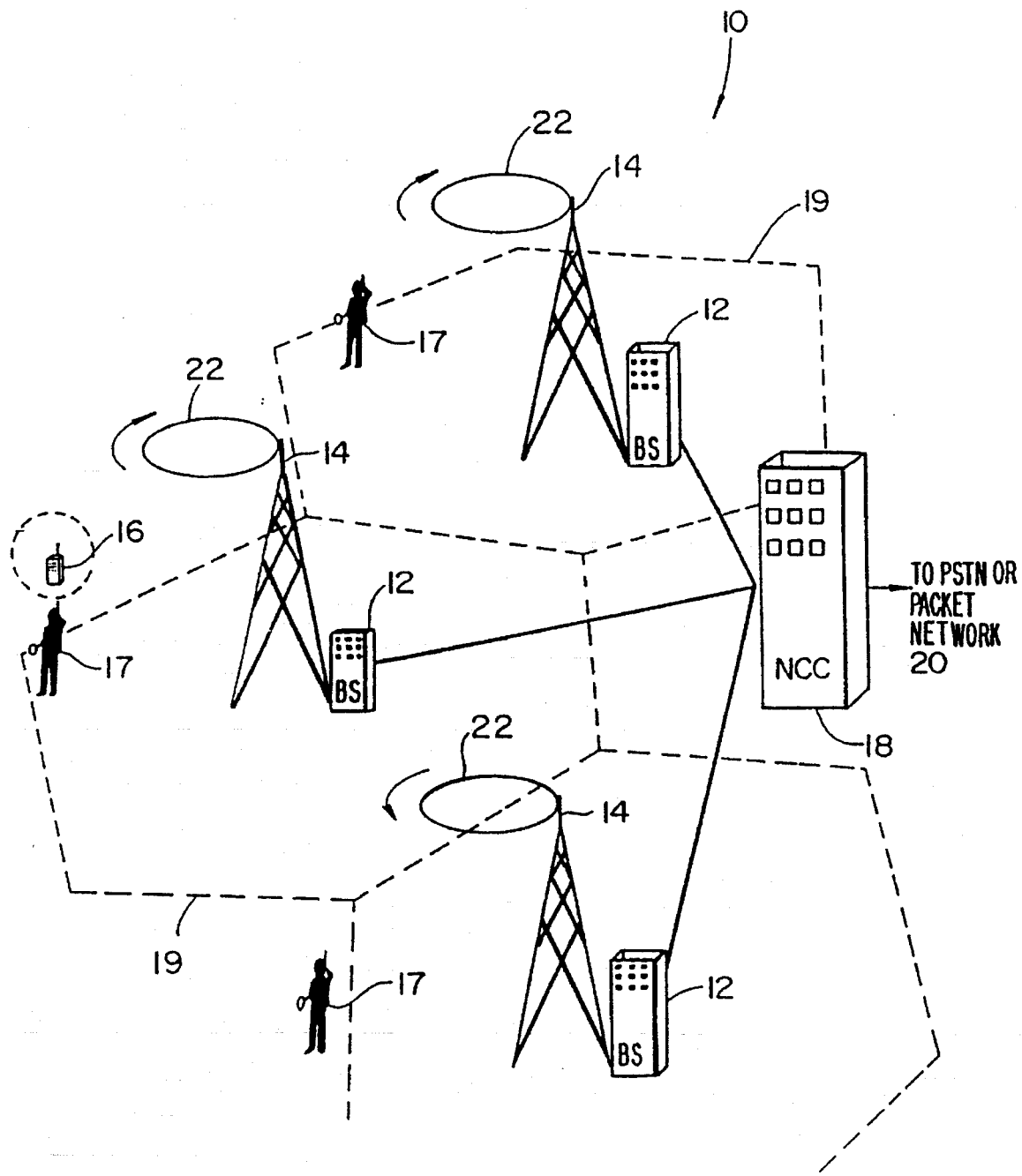
FIG. 1A illustrates a land-based wireless mobile communication system in accordance with a particular embodiment of the present invention.

Referring now to the drawings in greater detail, FIG. 1A is an overall perspective view of a land-based wireless mobile communication system 10 in accordance with the present invention. A plurality of base stations 12 are coupled to a telecommunications switching network 20, which may comprise, e.g., a PSTN (Public Switched Telephone Network), or a packet network. Each base station 12 includes a steerable base station receive antenna 14; the direction of the antenna beam of each antenna 14 is indicated by an antenna beam direction indicating symbol 22. A plurality of remote stations 16, which are compatible with the wireless communications system 10, may be dispersed throughout a coverage area (e.g., cell) 19 of each base station 12.

Figure 1B:
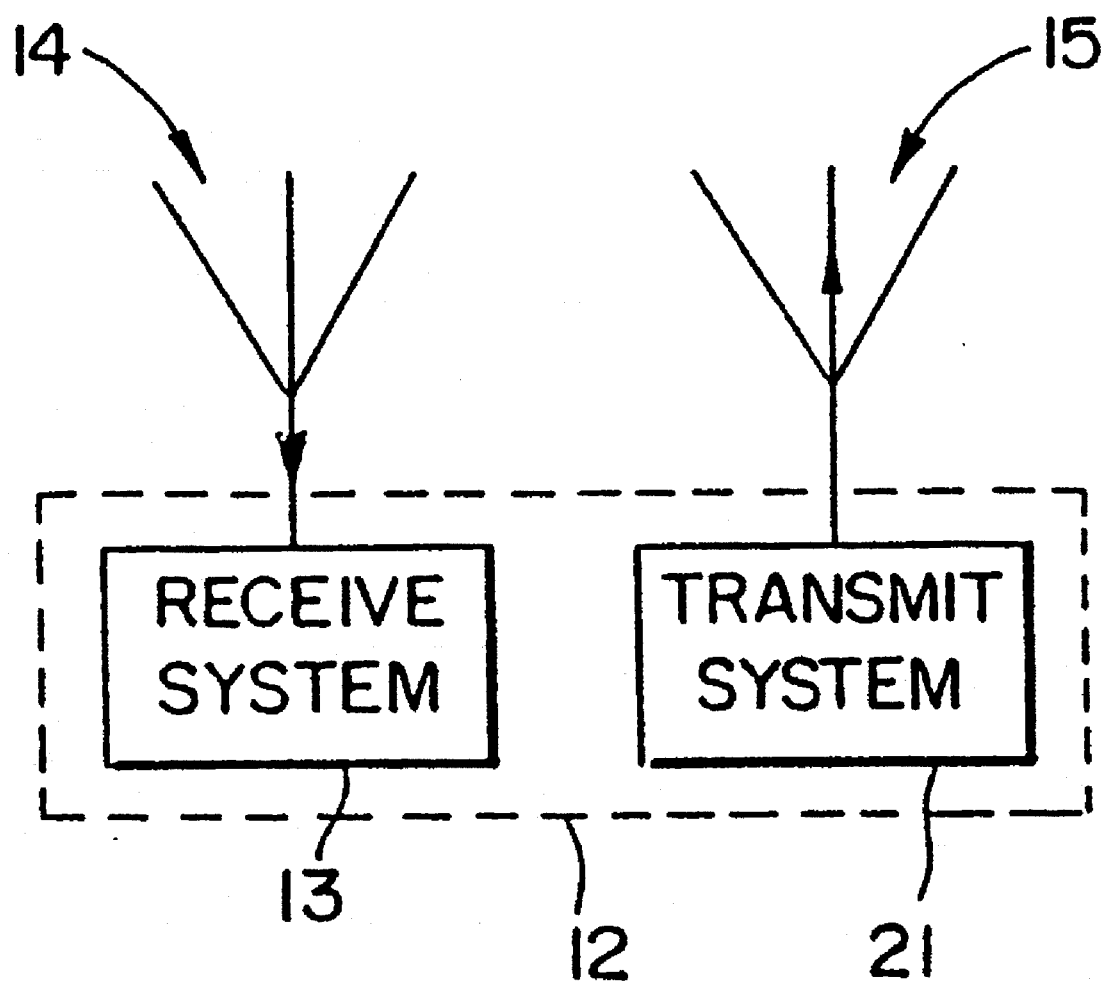
FIG. 1B illustrates a base station utilized in the mobile communications system shown in FIG. 1A.

As shown in FIG. 1B, each base station 12 includes a transmit antenna 15 and a receive antenna 14, which are coupled to a transmit system 21 and a receive system 13, respectively. Although the transmit and receive antennas are illustrated in FIG. 1B as distinct, the present invention does not preclude the use of a single transmit/receive antenna.

In FIG. 1B operation of the above-described communications network, information may be transmitted to a remote station 16 by either a remote station 16, or by an auxiliary network station (e.g., a telephone) which is connected to telecommunications switching network 20. In transmitting information from the telephone to a remote station 16, a call is initiated by a communicating party, and the information is routed through use of the telecommunications network 20 to network control center 18. The information is then forwarded to one or more appropriate base stations 12, which in turn transmit the information to the appropriate remote station 16, which comprises, e.g., a small, lightweight portable hand-held terminal or paging receiver.

Should wireless mobile communication system 10 comprise an answer back paging system, the remote subscriber 17 (i.e., the user of the remote station 16) will input the information to be returned to the communicating party into remote station 16, which will transmit the information, via an omni-directional transmit antenna, to a base station 12 corresponding to the coverage area 19 in which remote station 16 is located.

Base station 12 directs the narrow beam of its corresponding base station receive antenna 14 toward remote station 16, so that the information can be received by base station 12; base station 12 then forwards the received information to NCC 18, for subsequent transmission to the communicating party via telecommunications switching network 20.

Each base station receive antenna 14 includes a narrow, high gain receive pattern which is scanned throughout at least a portion of the coverage area 19 of the base station 12. In order to transmit information, each remote station 16 prefaces such information with a synchronization signal. Base station 12 scans the focused antenna beam (of base station receive antenna 14) azimuthly until the synchronization signal transmitted by a particular remote station 16 is received with a sufficiently strong signal level. Upon detection of this synchronization signal, the antenna beam is temporarily stopped and directed toward the location of the remote station 16, until such time as the information transmitted by the remote station 16 can be fully recovered by base station 12. Once the information transmitted by remote station 16 is received, base station 12 will resume scanning of the beam of base station receive antenna 14.

In order to effect transmission from base stations 12 to remote stations 16, each base station 12 may be provided with a high gain omni-directional base station transmit antenna 15 (FIG. 1B). Accordingly, by using an omni-directional transmit antenna 15, scanning will not be necessary in order to transmit information to a particular remote station 16.

Figure 2:
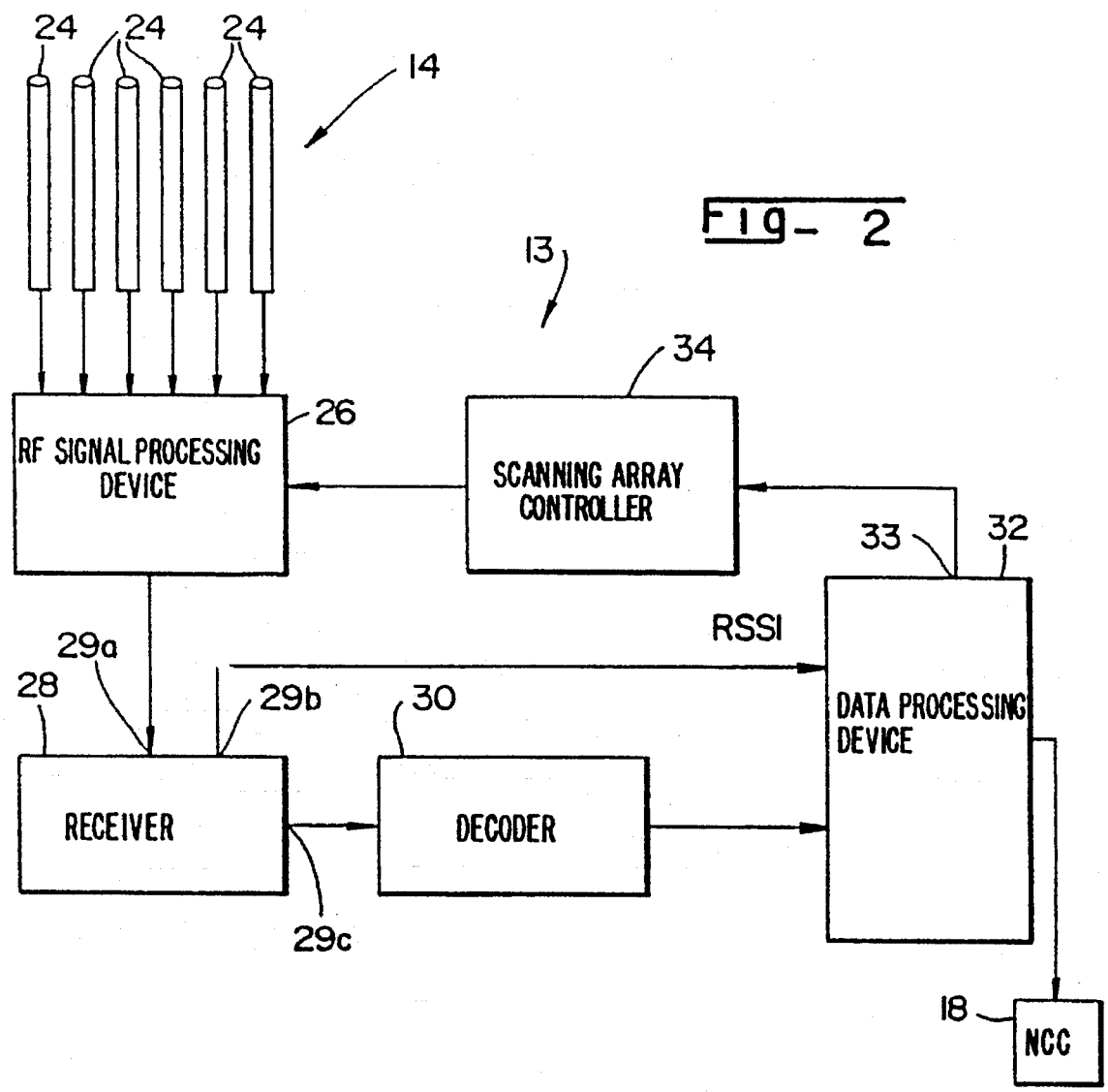
FIG. 2 illustrates a block diagram of a base station receive system of the land-based wireless mobile communication system shown in FIG. 1A.

FIG. 2 illustrates, in a block diagram, the receive system 13 of a base station 12 in accordance with a particular aspect of the present invention. Base station receive antenna 14 comprises an array of collinear antennas 24, each of which is connected to a respective input of an RF signal processing device 26. Base station receive antenna 14 is configured to have a directional pattern in a horizontal plane, and RF signal processing device 26 is provided to steer the directional pattern of receive antenna 14 azimuthly. Signals which are recovered from base station receive antenna 14 (i.e., which are located within the steered directional pattern) are output from RF signal processing device 26 and input to a receiver 28.

Receiver 28 comprises an input 29a, a received signal strength indicator (RSSI) output 29b, and a received signal output 29c. Received signal output 29c of receiver 28 is connected directly to a decoder 30, which is in turn connected, at an output thereof, to a data processing device 32. RSSI output 29b is also connected to a data processing device 32. Data processing device 32 has an output 33 which is connected to a scanning array controller 34 which controls the RF signal processing device 26 to steer (i.e., scan) the antenna beam.

Each of antennas 24 is fed into RF signal processing device 26 which controls the steering direction of the directional base station receive antenna 14. RF signal processing device 26 can, optionally, be implemented as a set of digitally controlled complex weights (e.g., digitally controlled phase shifters) that can be adjusted to steer a narrow beam in a designated direction. Alternatively, by way of example, should individual antenna elements be provided which have sufficient gain, RF signal processing device 26 can be implemented as a set of RF switches that are digitally controlled to switch on and off respective individual antenna elements or sets of antenna elements so that a high gain, narrow beam can be steered in a designated direction by choosing the individual antenna elements or sets of antenna elements.

In the embodiment depicted in FIG. 2, base station receive antenna 14 comprises an array of collinear dipole antennas 24. However, it is noted that any well-known antenna technique can be used to synthesize a high gain, electronically steerable antenna. For example, an array could be provided which consists of a microstrip patch antenna array, a waveguide horn antenna array, or an array of corner reflector antennas.

Scanning array controller 34 receives instructions from data processing device 32 regarding the position at which the beam of antenna 14 should be steered. Scanning array controller 34 provides scanning information to RF signal processing device 26 in an appropriate format readable by RF signal processing device 26, and (optionally) regulates the power input to elements within RF signal processing device 26. By way of example, the appropriate settings of RF signal processing device 26 may be set by a scanning array controller 34 which consists of a standard digital interface such as a Phase Shifter Interface Electronics (PIE) board which is commercially available from Electromagnetic Sciences, Inc., to be described in further detail below. However, any appropriate drive circuitry, such as, e.g., an analog interface, may be used.

Radio frequency signals that are received by base station receive antenna 14 are forwarded from base station receive antenna 14, via RF signal processing device 26, to an input 29a of receiver 28. Receiver 28 may comprise, e.g., a standard, commercially available radio receiver which extracts desired radio signals and removes undesired signals from those received by base station receive antenna 14. Receiver 28 demodulates any information impressed on an RF carrier of interest, and passes the demodulated signal, via an output 29c, to decoder 30. In addition, in accordance with the embodiment shown in FIG. 2, receiver 28 sends a Received Signal Strength Indication (RSSI) to data processing device 32, via an RSSI output 29b. The RSSI is provided as an indicator of the reliability and quality of the received signal, and can be used to aid data processing device 32 in determining the positioning of the beam heading of base station receive antenna 14.

Decoder 30 accepts the demodulated signal output from received signal output 29c of receiver 28, and conditions it to be compatible with data processing device 32. In the embodiment shown in FIG. 2, decoder 30 converts an analog demodulated signal into a digital format. Decoder 30 may comprise the necessary components, for example, to detect digital signals and analog signals (such as voice signals). In addition, in accordance with a particular embodiment of the present invention, decoder 30 may be provided with the necessary components to interpret portions of the demodulated signal. For example, decoder 30 may determine if a synchronization signal is present in a received signal, and inform data processing device 32 that a synchronization signal is present. Decoder 30 may also be provided with circuitry to detect and correct error patterns that may occur in the demodulated signal via standard correction techniques.

Data processing device 32 provides the overall decision intelligence for base station receive system 13. In the present embodiment, data processing device 32 is implemented using standard stored program control microprocessor techniques. Data processing device 32 instructs scanning array controller 34 to send appropriate instructions to position the antenna beam of base station receive antenna 14 to a specific azimuthal heading. Based on the RSSI and decoder signals, data processing device 32 determines the position at which the antenna beam should be placed. If the RSSI and decoder signals are such that a valid message is expected to be reliably received at a given heading of antenna 14, data processing device 32 will cause the antenna 14 to dwell at a particular azimuthal position and wait for a sufficiently long period of time to receive information from the remote station 16 of interest, which may include information such as Remote Station-identification, a destination address, and a message to be forwarded to a third party. Data processing device 32 also makes a determination as to whether the received information is reliable.

Each base station 12 (FIG. 1A) is provided with a base station transmit system 21 (FIG. 1B) in addition to base station receive system 13, shown in FIG. 2. Base station transmit system 21 can be implemented using conventional methods. Because adequate transmit power can be easily generated by the base station, since there are no limitations as to size and weight of the same, no scanning antenna is necessary to amplify or increase the range of the transmit antenna. It is noted that in certain applications (such as for fixed point-to-multi-point communications) it may be desirable to provide the base station transmit system with a scanning antenna system such as that utilized in the base station receive system 13 shown in FIG. 2.

Each remote station 16 of land-based wireless mobile communications system 10 (FIG. 1A) can be implemented using standard transceiver technology, and should be provided with a transmit message structure which allows the nearby base station 12 to position the scanning antenna 14 so that signals transmitted by remote station 16 can be received by base station 12.

Figure 3:
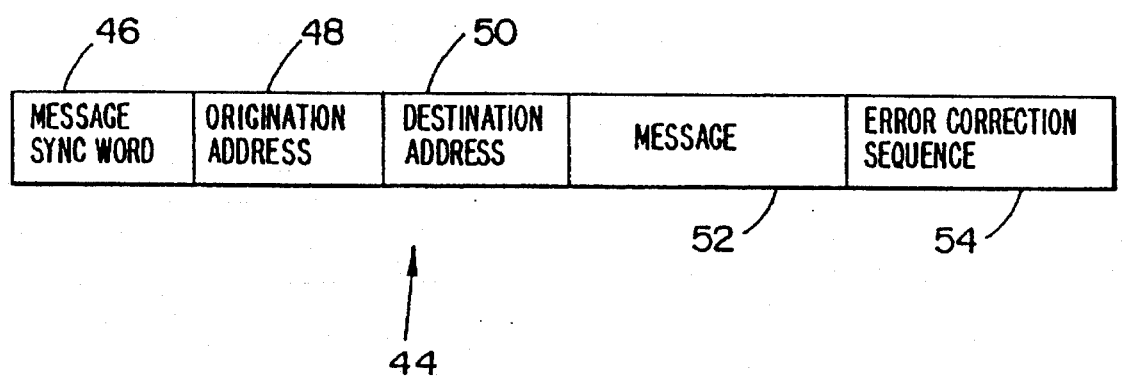
FIG. 3 illustrates a block diagram of the transmit message structure of a remote station transmitter to be implemented with the land-based wireless mobile communication system of FIG. 1A.

FIG. 3 illustrates one embodiment of transmit message structure 44 of remote stations 16. Transmit message structure 44 of remote station 16 can include a message sync word 46, an origination address 48, a destination address 50, a message 52, and an error correction sequence 54, each placed consecutively in time. Transmit message structure 44 can include, for example, a binary sequence having desired correlation properties, such as a Barker sequence. The origination address can be represented by a binary encoded identification sequence for identifying the remote station. The destination address can be represented by a binary encoded sequence which identifies the recipient of the message. The encoded message can be represented in binary encoded form, and includes, e.g., information that a subscriber 17 utilizing remote station 16 desires to send to another party. Standard error correction and detection techniques can be used to improve the reliability of the messages received. Reliability may be further enhanced when more than one base station 12 can receive signals transmitted by a remote station 16. This is due to a phenomenon known as macrodiversity.

With respect to the communications protocol of the overall communications system 10, an answer back paging system may be implemented having a protocol such as disclosed in published international patent application WO 89/08369, the content of which is expressly incorporated by reference herein in its entirety.

Network control center (NCC) 18 interfaces the land-based wireless mobile communication system 10 to an appropriate telecommunications switching network 20, such as, e.g., a public switch telephone network (PSTN), a packet data network, or another wireless network, etc. NCC 18 can be configured to provide additional capabilities such as position triangulation, elimination of duplicate messages, and selection of the best quality messages.

Figure 8:
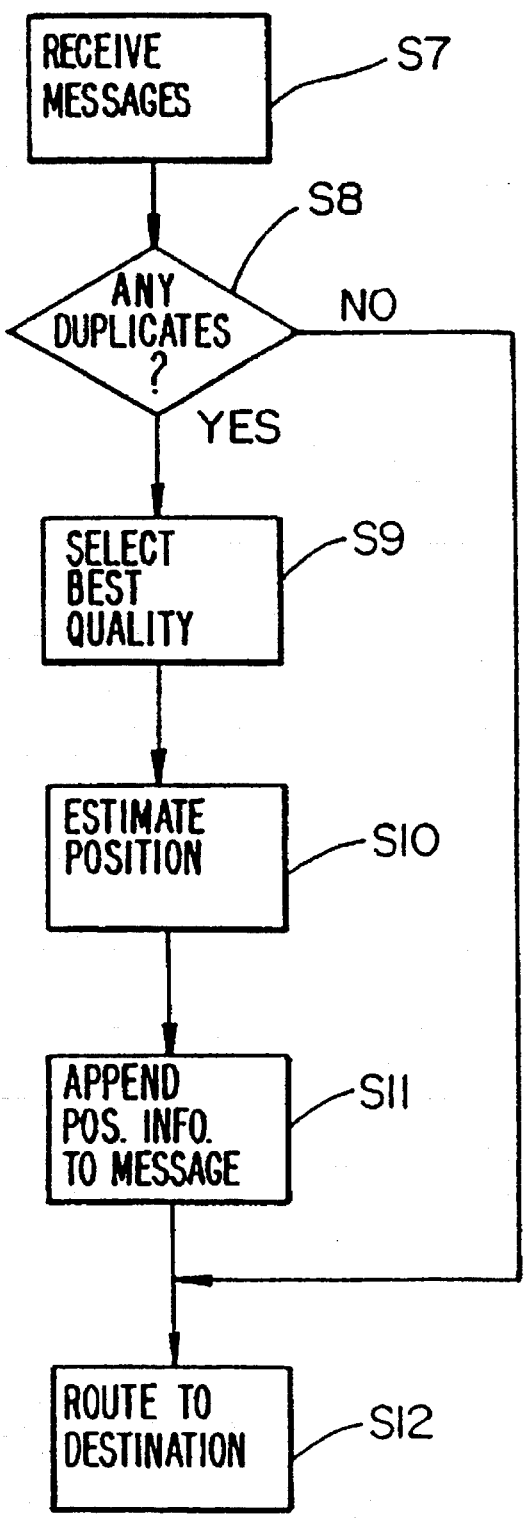
FIG. 8 illustrates, in a flow diagram, the operation of a network control center in accordance with a particular embodiment of the present invention.

FIG. 8 illustrates, in a flow diagram, the operation of NCC 18 in accordance with a particular embodiment of the present invention. In step S7, NCC 18 receives all messages from base stations 12 which have been received and processed without error. Subsequently, in step S8, NCC 18 determines whether duplicate messages exist. If so, in step S9, NCC 18 eliminates duplicate messages by selecting the one message that is estimated to be of the best quality for subsequent routing to the destination. In step S10, the position of the remote station, from which the message has been sent, is estimated by triangulation. Subsequently, in step S11, the position information is appended to the message information, and in step S12, the message information is routed to its destination via switching network 20.

The position information can be utilized by a recipient of the message information as a need for the same arises. For example, should it be desirable to track the location of a plurality of remote stations, the recipient of the message information can do so by appropriately decoding and processing the position information which is forwarded.

Should NCC 18 determine at step S8 that no duplicate messages exist, NCC will skip steps S9–S11, and proceed to route the message information to its destination at step S12.

It is noted that the message information may also include information for controlling NCC 18 itself. Such information could be used, for example, to provide a "key" (i.e., access code) needed to access the system, to indicate status information, to communicate with a system operated by another group, etc. NCC 18 may also be configured to collect statistics regarding system usage.

The operation of data processing device 32 will now be described in further detail while referring to the flow chart depicted in FIG. 4. In step S1, data processing device 32 instructs scanning array control 34 to cause antenna array 14 to scan to a next azimuthal position. Subsequently, in step S2, a determination is made as to whether a signal level received by receiver 28 (while antenna 14 is at the specified azimuthal position) is greater than a predetermined threshold value. If the signal is not greater than the threshold value, the process returns to step S1 and the antenna is scanned to a next azimuthal position. On the other hand, if the signal is determined to be greater than the threshold value at step S2, data processing device 32 proceeds to step S3 where a determination is made as to whether a sync code word has been detected, correctly decoded by decoder 30, and appropriately forwarded to data processing device 32. If such a sync code word has not been appropriately forwarded to data processing device 32, data processing device 32 proceeds to step S4, and a record is made (in an appropriate memory device [not shown]) that the particular azimuth position has interference. The process subsequently returns to step S1, to scan a next azimuthal position. If the sync code word is determined at step S3 to be properly forwarded and correct, data processing device 32 proceeds to step S5, and the remaining message information is decoded. Subsequently, in step S6, the message information is accepted by data processing device 32 and routed to network control center 18, which will appropriately route the message to the destination indicated by remote station 16. Subsequent to passing the message to network control center 18 at step S6, data processing device 32 will return to step S1.

Figure 4:
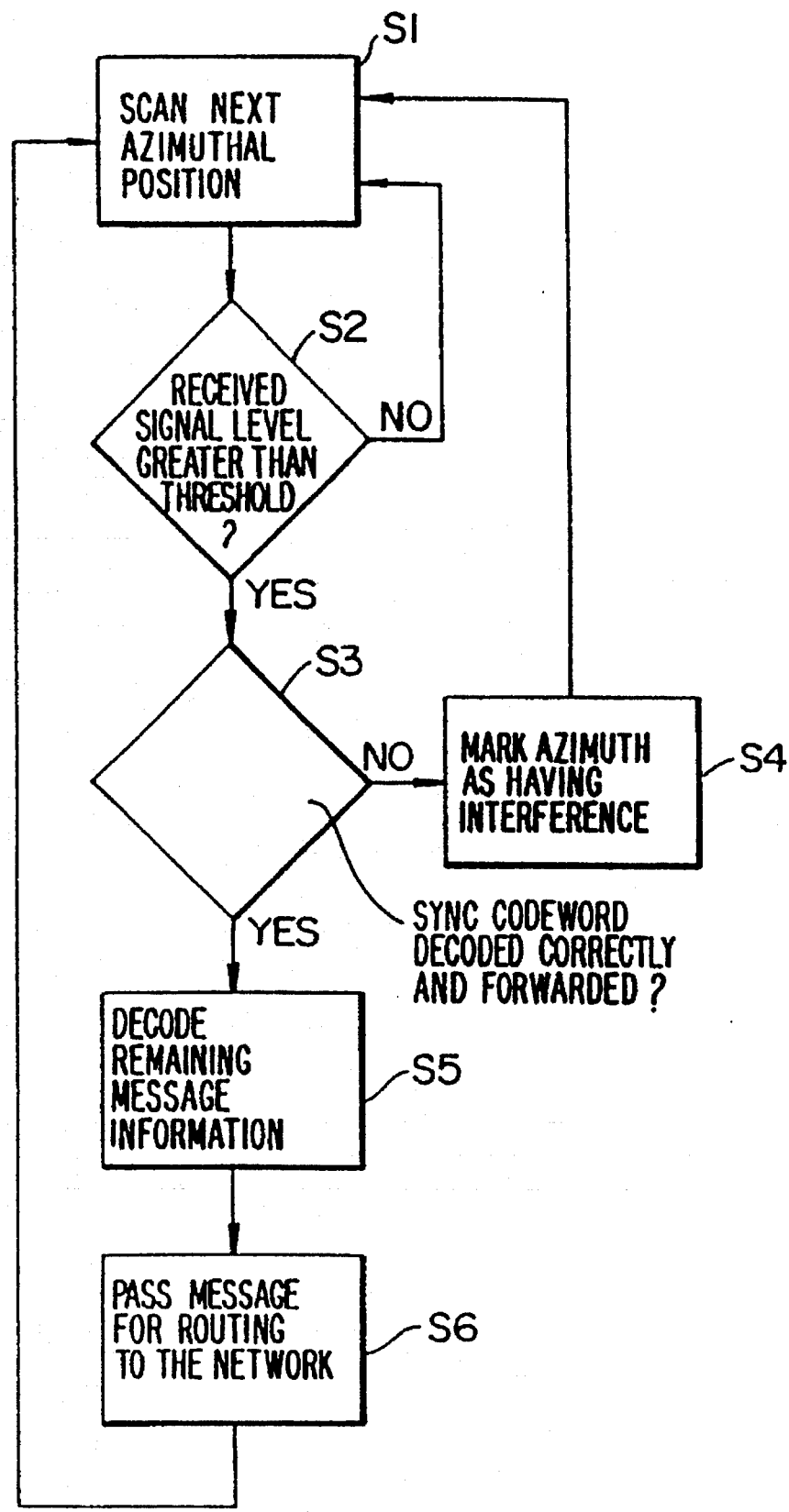
FIG. 4 illustrates, in a flow chart, the logical flow of a data processing device implemented in the base station receive system shown in FIG. 2.

The control process which is executed by data processing 32, as illustrated in FIG. 4, is not shown to include a switch for initiating or ending execution thereof. However, for any one of a number of reasons, such as to stop the system for maintenance purposes, such a switch may be provided.

By execution of the steps indicated in FIG. 4, a high gain, narrow azimuthal beam width antenna receive pattern is rapidly scanned over the area to be served (coverage area) until a synchronization pattern (message sync word) is detected. The synchronization pattern is transmitted by a remote station 16 when the remote station desires to send information to a specified destination. The synchronization pattern (in the form of a sync code word) is transmitted for a sufficient duration so that each base station within range can sweep through every azimuthal direction at least once and detect the presence of the synchronization pattern.

If the synchronization pattern is detected, the scanning antenna 14 is stopped and dwells at the azimuthal heading that produces the most reliable signal from remote station 16. Remote station 16 transmits its identification code, the code corresponding to the destination for the message, the message, and any error correction/detection information subsequent to the sync pattern. If base station 12 decodes this information without error, it sends the information to network control center 18 for routing to the appropriate destination. This routing can be accomplished via, e.g., a public switch telephone network (PSTN), a packet data network, a remote station of another wireless system via a local switch, or any other such switching network. An indication of the azimuthal beam heading may also be sent to NCC 18 from each base station 12 that decodes the message properly. NCC 18, in addition to receiving the messages, can also triangulate the position of each remote station 16 (if possible), and route a single copy of the message and remote station location to its destination.

Figure 5:
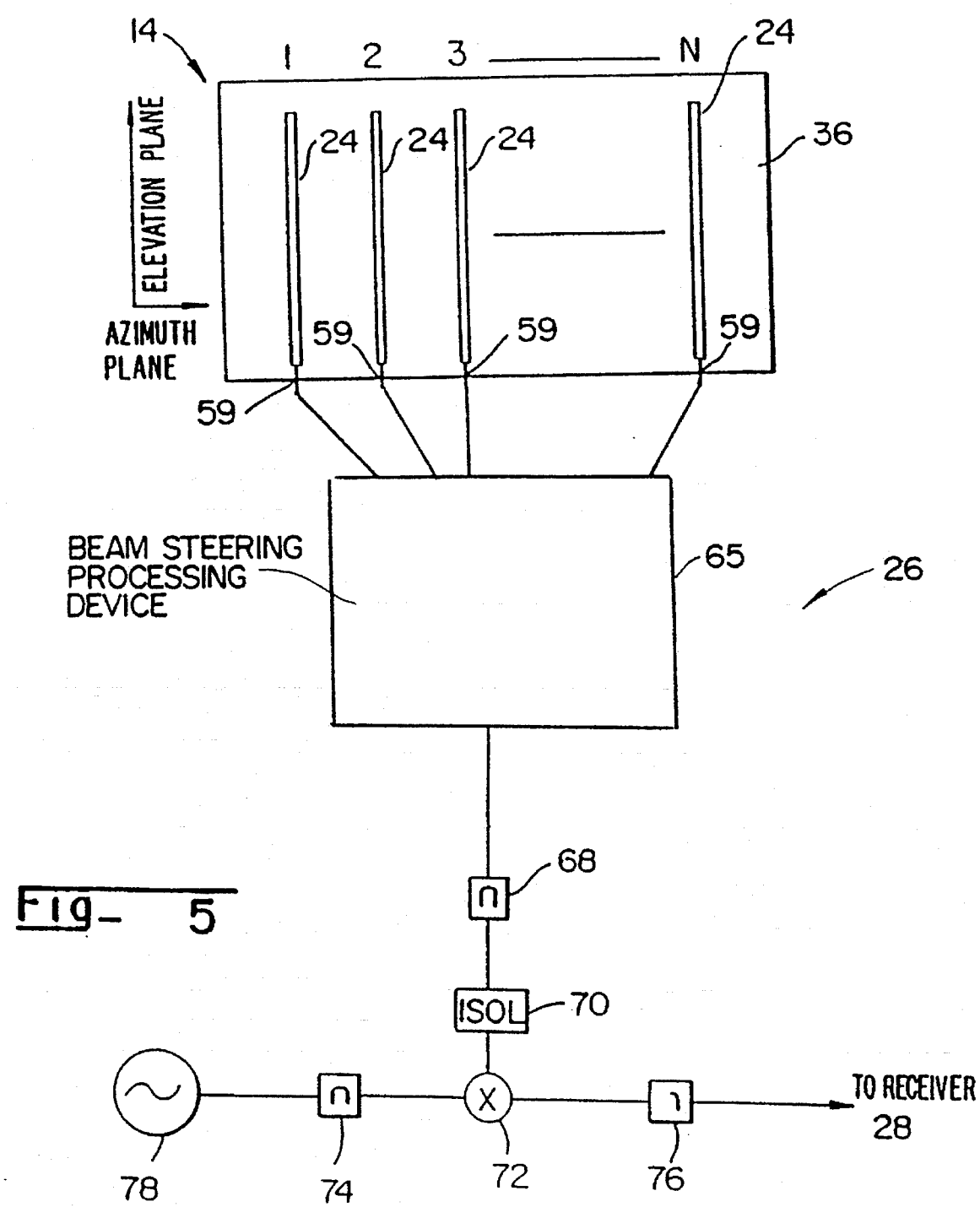
FIG. 5 illustrates a particular embodiment of a base station receive antenna coupled to an exemplary RF signal processing device.

FIG. 5 illustrates an exemplary embodiment of base station receive antenna 14 and RF signal processing device 26. Base station receiving antenna 14 comprises a plurality (1–N) of collinear dipole antennas 24 arranged in a parallel fashion in a plane which is parallel to an antenna ground plane 36. Each collinear dipole antenna 24 is placed less than one-half wavelength from an adjacent collinear dipole antenna 24. In the specific embodiments illustrated herein, the antenna will scan only in the azimuth plane. However, the antenna may be designed to also scan in the elevation plane.

Each terminal 59 of each antenna 24 is connected to a beam steering processing device 65. Beam steering processing device 65 is configured to steer the signal receiving beam of base station receive antenna 14 by, e.g., adjusting the phase or time of arrival of each signal received from each individual collinear dipole antenna 24. In order to adjust the phase or time of arrival of each signal, device 65 may be provided with, e.g., ferrite phase shifters, Time Delay Units (TDUs), PIN diode phase shifters, or commutated switchable lenses. In addition, beam steering processing device 65 is provided with a device for combining the signals received from the individual collinear dipole antennas 24. Beam steering processing device 65 may also be provided with bandpass filters, and amplifying devices, in any desired and effective order and combination.

Thus, in one non-limiting alternative, beam steering device 65 could comprise ferrite phase shifters in combination with appropriate bandpass filters and amplifiers, and one or more combiners, such that the system will be able to provide for beam steering, bandpass filtering, and combining of signals received by the array of antennas 24.

The output of beam steering processing device 65 is connected to a bandpass filter 68 which is connected in cascade to an isolator 70. Isolator 70 prevents signals from propagating back toward antenna 14. The output of isolator 70 is connected to a multiplier 72 (mixer), at which the signal output by isolator 70 is multiplied by a modulating signal from an oscillator 78. The modulating signal is filtered by a bandpass filter 74 and input to a second input terminal of multiplier 72. The resulting multiplied signal is input to a low pass filter 76 to remove high frequency signal components which are outside the range of receiver 28, and the output of low pass filter 76 is connected to receiver 28.

Each of the elements depicted in FIG. 5 may be implemented with commercially available components. As a non-limiting illustrative example, beam steering processing device 65 may be configured to include Electromagnetic Sciences 6-bit ferrite phase shifters, model 630-1, which are commercially available from Electromagnetic Sciences.

Isolator 70 prevents signals from propagating in a direction opposite to that intended (i.e., in a direction toward antenna 14), so that reflected signals are not transmitted. Oscillator 78, bandpass filter 74, multiplier 72 and low pass filter 76 together comprise a frequency down converter for shifting the signals received by antennas 24 to a frequency range of receiver 28.

The low noise frequency downconverter is used to translate the signals to a frequency range tunable within an existing general coverage of receiver 28, and may be configured to set the system noise figure.

Figure 6:
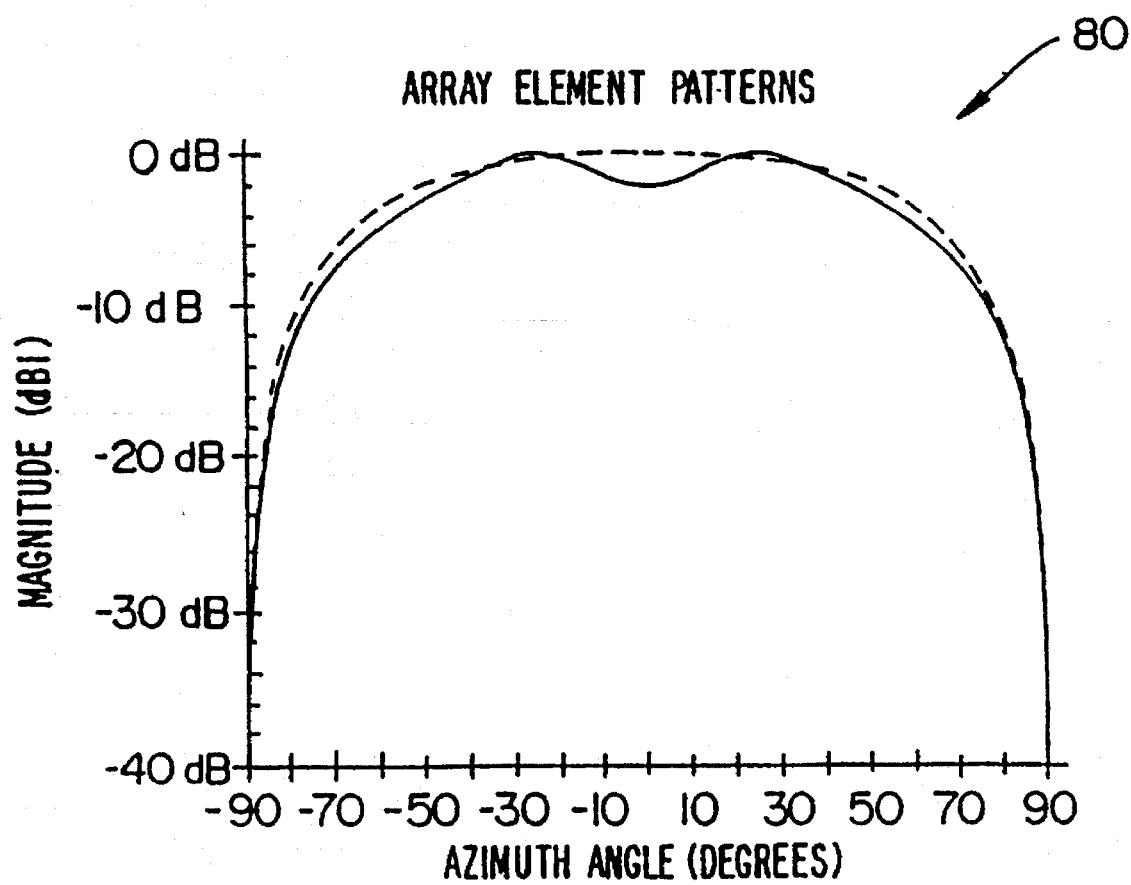
FIG. 6 illustrates an antenna pattern of a single array element of the base station receive antenna array which is shown in FIG. 2.

FIG. 6 illustrates a possible antenna element receive pattern 80 of an individual collinear dipole antenna 24 in an array environment. The solid line represents a calculated array element pattern, and the dotted line represents a theoretical cosine (azimuthal angle) pattern. The far field pattern for the array antenna has a cosine(x)/x pattern at broadside.

Referring back to FIG. 5, it is noted that a particular implementation of the antenna illustrated in FIG. 5 can include, as an illustrative example, the following features: For receiving microwave signals in a frequency band such as 2.4 GHz, the antenna can be configured to have a 3 dB (½ power) beam width of about 5.7° in the elevation plane and about 7.7° in the azimuth plane at a position broadside to the antenna. The directivity (i.e., the value of directive gain in a direction of maximum value) of the antenna may be about 28.6 dB with respect to an isotropic radiator. The antenna may be designed to have a first side lobe which is about 13 dB down from the principal pattern lobe at broadside, and can be configured to scan about + or −60° in the azimuth plane (0° being at the antenna broadside) without significant introduction of a grating lobe or splitting of the main beam. In the embodiment depicted, the dipole antennas 24 are separated by less than one-half wavelength.

Should the antenna be configured to scan an azimuthal range of 120°, a total of three systems will be required at each omnidirectional installation so that a total 360° azimuthal range can be scanned. Having three beams simultaneously scanning the coverage region will allow complete omnidirectional coverage by the receive system. Such a configuration has an additional advantage in that a portable terminal attempting to transmit can be acquired in a third of the time that a single omnidirectional array would require.

Figure 7:
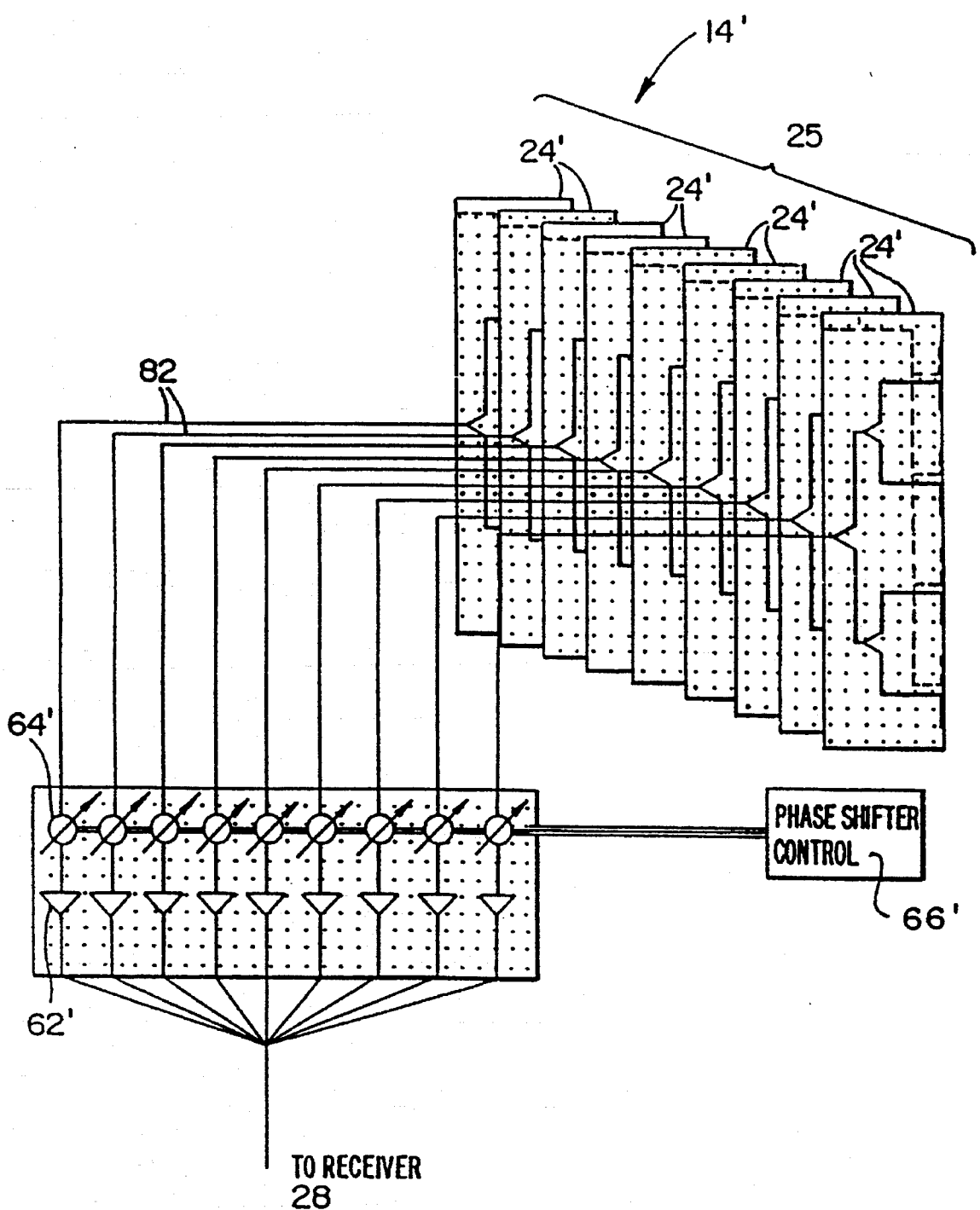
FIG. 7 illustrates a second embodiment base station receive antenna array which can be implemented in the land-based wireless mobile communication system of the present invention.

FIG. 7 illustrates a further embodiment of a base station receive antenna 14' which can be connected to each of base stations 12 (FIG. 1A) of land-based wireless mobile communications system 10 (FIG. 1A). Base station receive antenna 14' comprises an array 25 of dipole array element cards 24' with each card 24' comprising an N (e.g., N=4) dipole array element. Each card 24' is connected to a corresponding phase shifter 64' via an appropriate connector (e.g., coaxial) 82, and a low noise amplifier 62' is connected between an output of each variable phase shifter 64' and a combined signal terminal (which may include, e.g., a combiner [not shown]) which is input to receiver 28. Phase shifters 64', low noise amplifiers 62' and dipole array element cards 24' can be fully integrated, as shown, on one or more circuit boards. For example, these elements can be printed onto a dielectric substrate, such as, for example, glass epoxy printed circuit board material. This configuration renders the antenna assembly easily duplicated, accurate in specifications, and less expensive when mass produced. Further, as shown in FIG. 7, the phase shifters 64' may be controlled by a conventional phase shifter control 66'.

More information related to microstrip antennas, such as the one depicted in FIG. 7, is provided by J. R. James, P. S. Hall & C. Wood in a publication entitled *"Microstrip Antenna Theory and Design,"* Peter Peregrinus Ltd. (London), 1986, at pages 10 and 111–175, the content of which is expressly incorporated by reference herein in its entirety. Additional information regarding planar phase array antennas is provided by C. A. Balanis, in "Antenna Theory, Analysis and Design," Harper and Row (New York), 1982, at pages 202–274, and by Johnson & Jasik in "Antenna Engineering Handbook," McGraw Hill (New York), 1984, at pages 20-1 to 20–67. Each of these references is expressly incorporated by reference herein in its entirety.

Antenna 14 (FIG. 5) or 14' (FIG. 7) of mobile communication system 10 may include a steerable antenna with a specified value of gain and dynamic beam shaping for coverage shaping or null-steering. Cost reduction (among many other factors) may affect the antenna and control circuitry configurations to be implemented in the present invention.

The above-described elements of the present invention can be implemented with commercially available components. For example, receiver 28 (see FIG. 2) can be implemented with a Rhode-Schwarz ESVP receiver. Decoder 30 may comprise, for example, a paging receiver decoder based on the CCIR-RPC1 standard to synchronize and decode alphanumeric messages. In this regard, reference is made to "Standard Codes and Formats for International Radio Paging," Recommendations and Reports of CCIR, 1986 Vol. VIII-1, Geneva 1986, the content of which is expressly incorporated herein in its entirety. Origination address, destination address, and message information will be imbedded into the CCIR-specified message structure. Data processing device 32 may be implemented, for example, with the use of an IBM compatible personal computer. Scanning array controller 34 may comprise, for example, a Phase Shifter Interface Electronics (PIE) Board Interface which is manufactured by Electromagnetic Sciences, Inc., P.O. Box 7700, Norcross, Ga. 30091-7700, (404) 263-9200.

While the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein with reference to particular means, materials and embodiments, the invention is not intended to be limited to the particulars disclosed herein; rather, the invention extends to all equivalent structures, methods, and uses, such as are within the scope of the appended claims.

What is claimed is:

1. A radio communications system, comprising:
   one or more remote stations, each of said remote stations comprising means for transmitting an identifying signal pattern and message information within a frequency band;
   a base station for transmitting and receiving signals to and from said remote stations, said base station comprising at least one receiving antenna coupled to a base station receiver which monitors said frequency band, said at least one receive antenna having a directional pattern in a horizontal plane and means for scanning said directional pattern azimuthally;
   means for filtering a signal received at said at least one receive antenna
   means for processing said receive signal after filtering by said filtering means, said processing means comprising means for decoding information which is included in said received signals;
   means for monitoring a signal strength of said received signal; and
   means for controlling said scanning means; wherein said decoding means comprises means for decoding said identifying signal pattern, said system further comprising:
      means for determining if said identifying signal pattern has been correctly decoded; and
      means for decoding remaining portions of said received signal and forwarding a corresponding message to a network, if it is determined by said determining means that said identifying signal pattern has been correctly decoded;
   said means for controlling said scanning means further comprising means for instructing said scanning means to move said directional pattern from one azimuthal position to another if said identifying signal pattern has not been correctly decoded.

2. the radio communications system according to claim 1, wherein said means for controlling said scanning means comprises means for controlling scanning of said directional pattern as a function of the signal strength of said received signal.

3. The radio communications system according to claim 1, wherein said transmitting means of said remote stations further comprises means for phrasing said message information to include an origination address, a destination address, a message, and error correction information, wherein all of said message information is transmitted subsequent to transmission of said identifying signal pattern.

4. The radio communications system according to claim 1, wherein said means for controlling said scanning means comprises:

means for determining if the received signal strength, determined by said monitoring means, is greater than said predetermined threshold value; and means for instructing said scanning means to move said directional pattern from one azimuthal position to another if said received signal strength is not greater than said predetermined threshold value.

5. The radio communications system according to claim 4, wherein said threshold value comprises a signal level which is substantially higher than an expected background noise level.

6. The radio communications system according to claim 1, wherein said at least one receive antenna comprises an array of collinear antennas.

7. The radio communications system according to claim 1, wherein said radio communications system comprises a microcellular communications network.

8. The radio communications system according to claim 1, wherein said radio communications system comprises a wireless data network.

9. The radio communications system according to claim 1, wherein said radio communications system comprises an answer back paging system.

10. The radio communications system according to claim 1, said system further comprising a network control center connected to said base station and connected to a telecommunications switching network.

11. The radio communications system according to claim 1, wherein each of said remote stations comprises a transmitter which transmits signals having an effective isotropic radiated power of less than 4 watts.

12. The radio communications system according to claim 1, wherein each of said remote stations comprises a transmitter which transmits signals having an effective isotropic radiated power of less than 2 watts.

13. The radio communications system according to claim 1, wherein said directional pattern comprises a half power beam width in the azimuthal plane of less than 30 degrees and a half power beam width in the elevation plane of less than 30 degrees.

14. The radio communications system according to claim 1, wherein said directional pattern comprises a half power beam width in the azimuthal plane of less than 6 degrees and a half power beam width in the elevation plane of less than 8 degrees.

15. The radio communications system according to claim 1, wherein said at least one receive antenna comprises a plurality of distinct antennas, each of said distinct antennas comprising means for scanning a directional beam azimuthly across a range equal to a fraction of 360 degrees, said distinct antennas being arranged so that the total area scanned by said distinct antennas equals 360 degrees.

16. The radio communications system according to claim 1, further comprising a plurality of base stations, a portion of said plurality of base stations comprising receivers and corresponding scanned base station receive antennas which share a common frequency channel, and means for synchronizing the scanning of said base station receive antennas which share said common frequency channel.

17. The radio communications system according to claim 1, wherein each of said remote stations comprises an omnidirectional antenna coupled to a transmitter and a receiver, for transmitting and receiving signals to and from said base station.

18. The radio communications system according to claim 1, wherein said base station comprises an omnidirectional transmit antenna.

19. The radio communications system according to claim 1, wherein said instructing means instructs said scanning means to continuously scan said directional pattern azimuthally until the signal strength of said received signal is detected to be above said predetermined threshold value.

20. The radio communications system according to claim 1, wherein selected ones of said remote stations comprise means for transmitting a message structure that includes an identifying signal pattern, and said processing means comprises means for decoding said identifying signal pattern, said instructing means instructing said scanning means to resume scanning of said directional pattern, even after the signal strength of said received signal is detected to be above said predetermined threshold value, if said identifying signal pattern has not been correctly decoded by said decoding means.

21. A method for communicating, comprising:

operating a base station to transmit and receive signals to and from one or more remote stations, said method comprising azimuthally scanning at least one receive antenna coupled to a receiver of the base station, wherein said at least one receive antenna has a directional pattern in a horizontal plane;

operating selected ones of said remote stations to transmit an identifying signal pattern and message information within a frequency band monitored by said base station receiver;

filtering a signal received at said at least one receive antenna;

processing said received signal after filtering, said processing comprising decoding information which is included in said received signal;

monitoring the signal strength of said received signal; and controlling said scanning;

wherein said decoding comprises decoding said identifying signal pattern, said method further comprising:

determining if said identifying signal pattern has been correctly decoded;

decoding remaining portions of said received signal and forwarding a corresponding message to a network, if it is determined, during said determining, that said identifying signal pattern has been correctly decoded; and controlling said scanning to move said directional pattern from one azimuthal position to another if said identifying signal pattern has not been correctly decoded.

22. The method for communicating according to claim 21, further comprising controlling scanning of said directional pattern as a function of the signal strength of said received signal.

23. The method for communicating according to claim 21, further comprising operating said selected ones of said remote stations to phrase said message information to include an origination address, a destination address, a message, and error correction information, so that all of said message information is transmitted subsequent to transmission of said identifying signal pattern.

24. The method for communicating according to claim 21, further comprising:
   determining if the received signal strength is greater than said predetermined threshold value; and
   controlling said scanning to move said directional pattern from one azimuthal position to another if said received signal strength is not greater than said predetermined threshold value.

25. The method for communicating according to claim 24, wherein said predetermined threshold value comprises a signal level which is substantially higher than an expected background noise level.

26. The method for communicating according to claim 21, wherein said at least one receive antenna comprises an array of collinear antennas.

27. The method for communicating according to claim 21, wherein said method utilizes a microcellular communications network.

28. The method for communicating according to claim 21, wherein said method utilizes a wireless data network.

29. The method for communicating according to claim 21, wherein said method utilizes an answer back paging system.

30. The method for communicating according to claim 21, further comprising operating a network control center which is connected to said base station and is connected to a telecommunications switching network.

31. The method for communicating according to claim 21, wherein each of said remote stations comprises a transmitter which transmits signals having an effective isotropic radiated power of less than 4 watts.

32. The method for communicating according to claim 21, wherein each of said remote stations comprises a transmitter which transmits signals having an effective isotropic radiated power of less than 2 watts.

33. The method for communicating according to claim 21, wherein said directional pattern comprises a half power beam width in the azimuthal plane of less than 30 degrees, and a half power beam width in the elevation plane of less than 30 degrees.

34. The method for communicating according to claim 21, wherein said directional pattern comprises a half power beam width in the azimuthal plane of less than 6 degrees, and a half power beam width in the elevation plane of less than 8 degrees.

35. The method for communicating according to claim 21, wherein said at least one receive antenna comprises a plurality of distinct antennas, said scanning comprising scanning a directional beam of each of said distinct antennas azimuthly across a range equal to a fraction of 360 degrees, said distinct antennas being arranged so that the total area scanned by said distinct antennas equals 360 degrees.

36. The method for communicating according to claim 21, further comprising:
   operating a plurality of base stations, a portion of said plurality of base stations comprising receivers and corresponding scanned base station receive antennas which share a common frequency channel; and
   synchronizing the scanning of said base station receive antennas which share said common frequency channel.

37. The method for communicating according to claim 21, wherein each of said remote stations comprises an omnidirectional antenna coupled to a transmitter and a receiver, for transmitting and receiving signals to and from said base station.

38. The method for communicating according to claim 21, wherein said base station comprises an omnidirectional transmit antenna.

39. The method for communicating according to claim 21, further comprising instructing said scanning means to continuously scan said directional pattern azimuthally until the signal strength of said received signal is detected to be above said predetermined threshold value.

40. The method for communicating according to claim 21, further comprising operating selected ones of said remote stations to transmit a message structure that includes an identifying signal pattern, wherein said processing comprises decoding said identifying signal pattern and said instructing comprises instructing said scanning means to resume scanning of said directional pattern, even after the signal strength of said received signal is detected to be above said predetermined threshold value, if said identifying signal pattern has not been correctly decoded.

* * * * *